United States Patent
Cho et al.

(10) Patent No.: US 12,062,778 B2
(45) Date of Patent: Aug. 13, 2024

(54) SULFUR-CARBON COMPOSITE AND MANUFACTURING METHOD THEREFOR

(71) Applicant: LG CHEM, LTD., Seoul (KR)

(72) Inventors: Eunkyung Cho, Daejeon (KR); Hyunah Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 981 days.

(21) Appl. No.: 17/042,405

(22) PCT Filed: Sep. 27, 2019

(86) PCT No.: PCT/KR2019/012627
§ 371 (c)(1),
(2) Date: Sep. 28, 2020

(87) PCT Pub. No.: WO2020/067793
PCT Pub. Date: Apr. 2, 2020

(65) Prior Publication Data
US 2021/0143407 A1   May 13, 2021

(30) Foreign Application Priority Data

Sep. 28, 2018   (KR) ........................ 10-2018-0115668
Sep. 28, 2018   (KR) ........................ 10-2018-0115677

(51) Int. Cl.
*H01M 4/36* (2006.01)
*H01M 4/38* (2006.01)
*H01M 4/587* (2010.01)
*H01M 4/62* (2006.01)
*H01M 10/0525* (2010.01)
*H01M 4/02* (2006.01)

(52) U.S. Cl.
CPC ............ *H01M 4/364* (2013.01); *H01M 4/38* (2013.01); *H01M 4/587* (2013.01); *H01M 4/625* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

2012/0119158 A1   5/2012   Barchasz et al.
2013/0034762 A1   2/2013   Marple et al.
(Continued)

FOREIGN PATENT DOCUMENTS

CN   104779378 A   7/2015
CN   105990569 A   10/2016
(Continued)

OTHER PUBLICATIONS

Abdullahi et al., "Characterization of Carbon Nanotube Reinforced Aluminium Nanocomposite Using Field Emission Scanning Electron Microscope", International Journal of Engineering Materials and Manufacture, vol. 3, No. 1, 2018, pp. 63-67.
(Continued)

*Primary Examiner* — Wyatt P McConnell
(74) *Attorney, Agent, or Firm* — Birch, Stewart, Kolasch & Birch, LLP

(57) ABSTRACT

A sulfur-carbon composite for controlling the particle size of the sulfur-carbon composite to a specific range and a method for preparing the same.

20 Claims, 2 Drawing Sheets

(56) References Cited

U.S. PATENT DOCUMENTS

| | | |
|---|---|---|
| 2016/0181602 A1 | 6/2016 | Mutoh et al. |
| 2016/0190544 A1* | 6/2016 | Slocum ............... H01M 4/0478 |
| | | 264/71 |
| 2016/0248087 A1 | 8/2016 | Kim et al. |
| 2017/0317343 A1 | 11/2017 | Watanabe et al. |
| 2017/0323735 A1 | 11/2017 | Roh et al. |
| 2018/0034050 A1* | 2/2018 | Son .................. H01M 4/0471 |
| 2018/0138503 A1 | 5/2018 | Kim et al. |
| 2018/0233734 A1 | 8/2018 | Ahn et al. |
| 2020/0220169 A1 | 7/2020 | Kim et al. |
| 2020/0235394 A1 | 7/2020 | Lee et al. |
| 2021/0234159 A1 | 7/2021 | Kim et al. |

FOREIGN PATENT DOCUMENTS

| | | |
|---|---|---|
| EP | 3214674 A1 | 9/2017 |
| EP | 3887779 A2 | 8/2020 |
| JP | 2009-110767 A | 5/2009 |
| JP | 2013-229227 A | 11/2013 |
| JP | 2016-535716 A | 11/2016 |
| JP | 2020-536360 A | 12/2020 |
| JP | 2021-520042 A | 8/2021 |
| KR | 10-2012-0039029 A | 4/2012 |
| KR | 10-2015-0014793 A | 2/2015 |
| KR | 10-2015-0045304 A | 4/2015 |
| KR | 10-2016-0021280 A | 2/2016 |
| KR | 10-1614613 B1 | 4/2016 |
| KR | 10-2017-0032190 A | 3/2017 |
| KR | 10-2017-0057423 A | 5/2017 |
| KR | 10-1737217 B1 | 5/2017 |
| KR | 10-2017-0113212 A | 10/2017 |
| KR | 10-2018-0017796 A | 2/2018 |
| KR | 10-2019-0060262 A | 6/2019 |
| WO | WO 2015/056925 A1 | 4/2015 |
| WO | WO 2019/103328 A2 | 5/2019 |

OTHER PUBLICATIONS

International Search Report issued in PCT/KR2019/012627 (PCT/ISA/210), dated Dec. 30. 2019.

Kawase et al., "Low Temperature Sulfur Deposition for High-Performance Lithium/Sulfur Cells", Journal of The Electrochemical Society, vol. 165 (9), 2018, pp. A1805-A1812.

Database WPI Week 201515, "Sulfur-carbon Complex for Anode of Lithium-Sulfur Battery in Battery Module, Has Carbon Granules Positioned in Particle Surface, Where Value of Granules is Specific Times Greater than Value of Particle Based on Distribution of Particle Size," Thomson Scientific, London, GB, AN 2015-138484, Feb. 9, 2015, 1 page, XP002803263.

Database WPI Week 201945, "Sulfur-carbon Composite Used for Anode for Lithium-Sulfur Battery. Comprises Porous Carbon Material, and Sulfur Coated on at Least One Portion of Inside and Surface of Porous Carbon Material, and has Preset Pore Volume and Average Pore Size," Thomson Scientific, London, GB, AN 2019-484009, May 31, 2019, 3 pages, XP002603257.

Extended European Search Report, daled Jun. 21, 2021, for European Application No. 19868071.2.

Xu et al., "Mesoporous Carbon-Carbon Nanotube-Sulfur Composite Microspheres for High-Areal-Capacity Lithium-Sulfur Battery Cathodes", ACS Appl. Mater. Interfaces, vol. 5, 2013, pp. 11355-11362.

\* cited by examiner

[Figure 1]
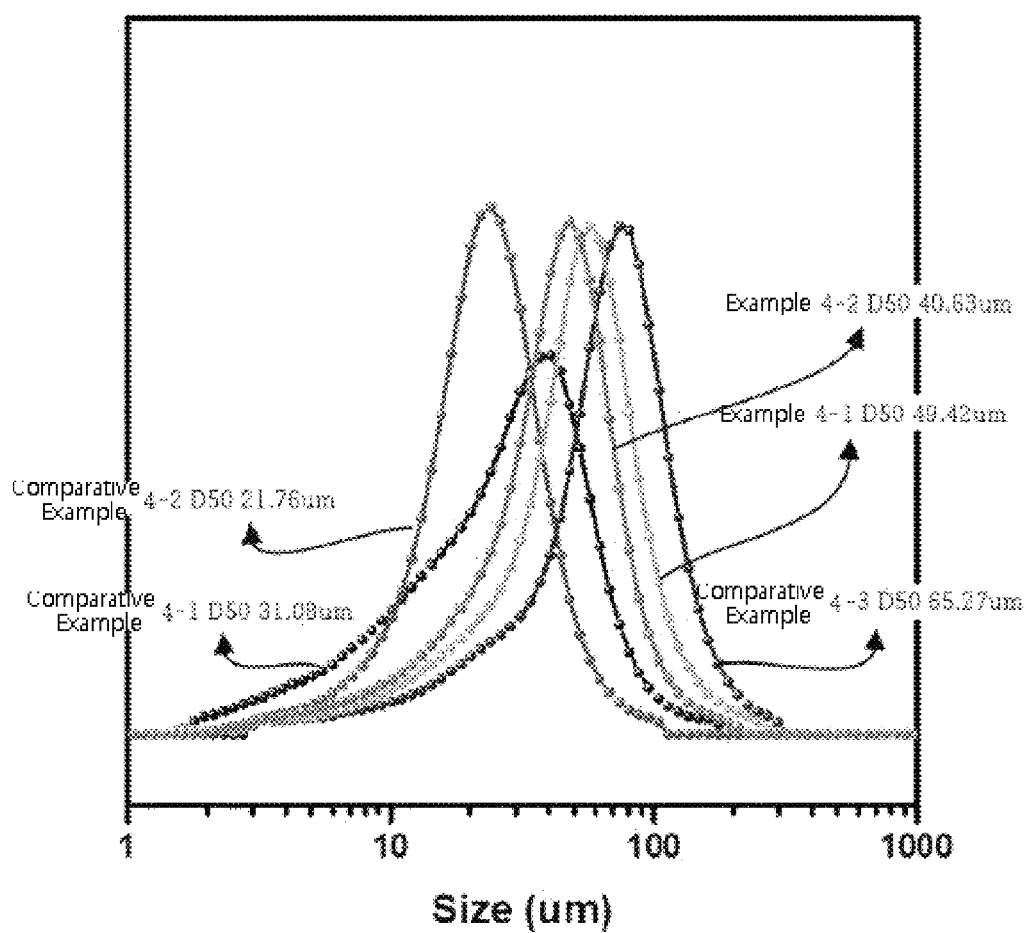

[Figure 2]
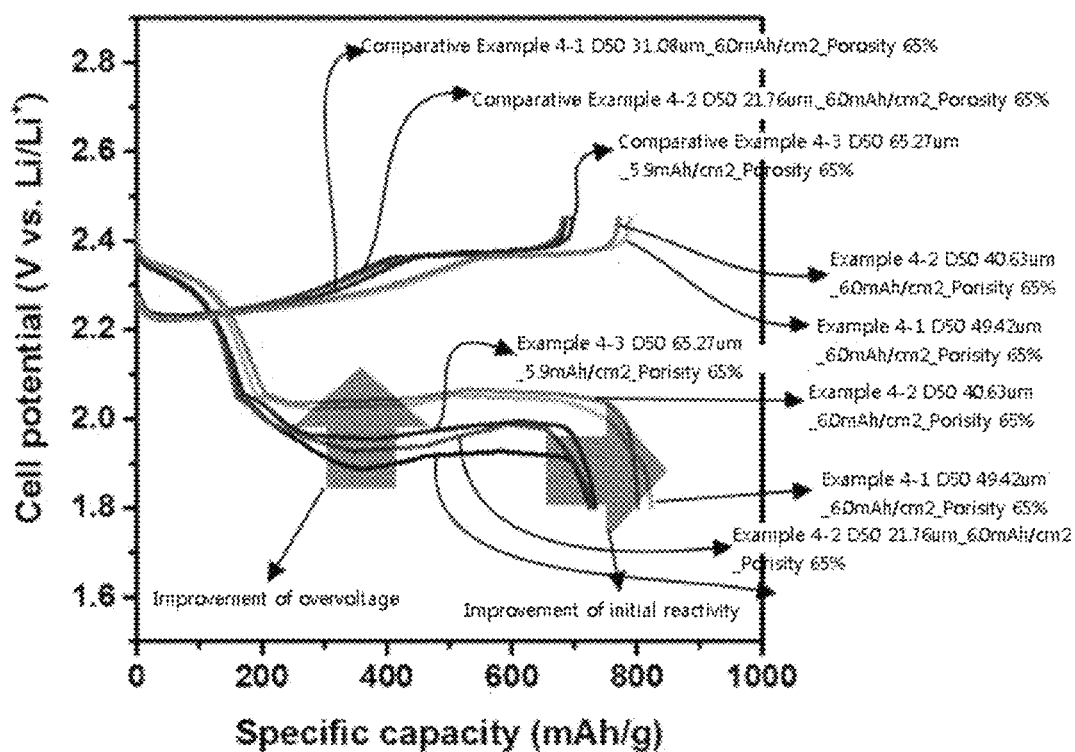

SULFUR-CARBON COMPOSITE AND MANUFACTURING METHOD THEREFOR

TECHNICAL FIELD

This application claims the benefits of priorities based on Korean Patent Application No. 10-2018-0115668 filed on Sep. 28, 2018 and Korean Patent Application No. 10-2018-0115677 filed on Sep. 28, 2018, the entire contents of which are incorporated herein by reference.

The present invention relates to a sulfur-carbon composite and a preparation method thereof.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely.

Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity density and energy efficiency.

Among the secondary batteries currently being applied, the lithium secondary battery developed in the early 1990s is attracting much attention as there is an advantage in that it has much higher operating voltage and energy density than conventional batteries such as Ni-MH, Ni—Cd, and sulfuric acid-lead batteries using an electrolyte solution in the form of an aqueous solution.

In particular, the lithium-sulfur (Li—S) battery is a secondary battery using a sulfur-based material having a sulfur-sulfur bond (S—S bond) as a positive electrode active material and using lithium metal as a negative electrode active material. The lithium-sulfur battery has advantages in that sulfur, which is the main material of the positive electrode active material, is very rich in resources, is not toxic, and has a low atomic weight. In addition, theoretical discharge capacity of the lithium-sulfur battery is 1,675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is attracting attention as a battery having high energy density characteristics.

During the discharging of the lithium-sulfur battery, an oxidation reaction of lithium occurs at the negative electrode (anode) and a reduction reaction of sulfur occurs at the positive electrode (cathode). Sulfur before discharging has an annular S$_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reduction reaction in which the oxidation number of S increases. During this reaction, the sulfur is converted from the annular S$_8$ structure to the lithium polysulfide (Li$_2$S$_x$, x=8, 6, 4, 2) by the reduction reaction and eventually, when the lithium polysulfide is completely reduced, lithium sulfide (Li$_2$S) is finally produced. By the process of reducing to each lithium polysulfide, the discharging behavior of the lithium-sulfur battery is characterized by a step-wise discharge voltage unlike lithium ion battery.

The lithium-sulfur battery has a higher energy density than the conventional battery, but in order to realize such a high energy density, it is necessary to manufacture a high loading electrode, and the technology that enables cell operation at high loading electrodes is very important.

[Patent Document 1] Japanese Laid-open Patent Publication No. 2016-535716, "Carbon nanotube-sulfur composite including carbon nanotube aggregates and a method for producing the same"

DISCLOSURE

Technical Problem

As a result of various studies, the present inventors have found that the control of the particle size of sulfur-carbon composites has an important effect on the operation of high loading electrodes, and in this case, various methods for controlling the particle size of the composite can be applied, thereby having completed the present invention.

Therefore, it is an object of the present invention to provide sulfur-carbon composites and a preparation method thereof, which control, when prepared as a positive electrode material of a battery, the particle size of the sulfur-carbon composites distributed in the electrode, and thus facilitate entry and exit of electrolyte solution in the electrode to adjust the distribution of the particle size, so that the overvoltage may be improved during discharging and the initial reactivity may be improved.

Technical Solution

In order to achieve the above object, the present invention provides a method for preparing a sulfur-carbon composites-composite comprising:

(a) mixing sulfur with the a porous carbon material; and (b) heat-treating the mixed porous carbon material and sulfur to prepare the sulfur-carbon composite, wherein a particle size (based on D$_{50}$) of the sulfur-carbon composite is adjusted in the range of 30 μm to 70 μm.

In addition, the present invention provides a sulfur-carbon composite comprising a porous carbon material; and sulfur on at least part of an inside and a surface of the porous carbon material, wherein a particle size (based on D$_{50}$) of the sulfur-carbon composite is in the range of 30 μm to 70 μm.

In addition, the present invention provides a positive electrode comprising the sulfur-carbon composite.

In addition, the present invention provides a lithium secondary battery comprising a positive electrode; a negative electrode; and an electrolyte.

Advantageous Effects

According to the present invention, by controlling the particle size of the sulfur-carbon composite, when the battery is manufactured, there is an effect that the overvoltage can be improved and the initial reactivity can be improved.

DESCRIPTION OF DRAWINGS

FIG. 1 is a graph showing particle size distribution of sulfur-carbon composites prepared in Examples 4-1 to 4-2 of the present invention and Comparative Examples 4-1 to 4-3.

FIG. 2 is a graph showing the initial discharge capacity of the battery prepared by the sulfur-carbon composite prepared in Examples 4-1 and 4-2 of the present invention and Comparative Examples 4-1 to 4-3.

BEST MODE

Hereinafter, the present invention will be described in detail with reference to the accompanying drawings so that those skilled in the art can easily carry out the present invention. However, the present invention can be embodied in various different forms, and is not limited thereto.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases from each other.

A lithium secondary battery is a generic term for batteries that can be stored and used continuously through oxidation-reduction reactions occurring at the positive and negative electrodes, and the lithium secondary battery stores electrical or chemical energy, while lithium ions moving along the electrolyte between the positive and negative electrode materials form an electrical neutrality with electrons moving through the wire, when charging/discharging occurs.

Among these, the lithium-sulfur battery uses sulfur as a positive electrode active material and lithium metal as a negative electrode active material. During the discharging of the lithium-sulfur battery, an oxidation reaction of lithium occurs at the negative electrode and a reduction reaction of sulfur occurs at the positive electrode. In this case, the reduced sulfur is combined with lithium ions transferred from the negative electrode, and converted to lithium polysulfide, followed by a reaction to finally form lithium sulfide.

The lithium-sulfur battery has a much higher theoretical energy density than the conventional lithium secondary battery, and is attracting attention as the next-generation battery due to advantage that sulfur, which is used as a positive electrode active material, has abundant resources and a low price, thereby lowering the manufacturing cost of the battery.

Despite the advantages of such lithium-sulfur battery, it is difficult to achieve all theoretical energy densities in actual operation, due to the low electrical conductivity and lithium ion conductivity of sulfur which is a positive electrode active material.

In order to improve the electrical conductivity of sulfur, a method of forming a composite with a conductive material such as carbon or a polymer, or coating is used. Among the various methods, sulfur-carbon composite is most commonly used as a positive electrode active material because it is effective in improving the electrical conductivity of the positive electrode, but it is not still sufficient in terms of the charging/discharging capacity and the efficiency. The capacity and efficiency of a lithium-sulfur battery may vary depending on the amount of lithium ions delivered to the positive electrode. Therefore, facilitating the transfer of lithium ions to the inside of the sulfur-carbon composite is important for high capacity and high efficiency of the battery.

In the development of such a high loading electrode, the control of the particle size of the sulfur-carbon composite has an important effect, and in this case, various methods may be applied to control the particle size of the composite.

Preparation Method of Sulfur-Carbon Composite

Therefore, in order to develop a high loading electrode with improved overvoltage and improved initial reactivity, the present invention provides a method for preparing a sulfur-carbon composite, wherein the particle size (based on $D_{50}$) of the sulfur-carbon composite is adjusted in the range of 30 to 70 μm.

First, the method for preparing a sulfur-carbon composite according to the present invention comprises (a) mixing sulfur with a porous carbon material; and (b) heat-treating the mixed porous carbon material and sulfur to prepare the sulfur-carbon composite, wherein a particle size (based on $D_{50}$) of the sulfur-carbon composite is adjusted in the range of 30 μm to 70 μm.

The method for preparing a sulfur-carbon composite according to the present invention comprises (a) mixing sulfur with the porous carbon material.

The porous carbon material provides a framework in which sulfur which is a positive electrode active material can be uniformly and stably immobilized, and supplements the electrical conductivity of sulfur to enable the electrochemical reaction to proceed smoothly.

The porous carbon material can be generally produced by carbonizing precursors of various carbon materials. The porous carbon material may comprise uneven pores therein and the porosity may be in the range of 10 to 90% of the total volume of the porosity. If the average diameter of the pores is less than the above range, the pore size is only at the molecular level and impregnation with sulfur is impossible. On the contrary, if the average diameter of the pores exceeds the above range, the mechanical strength of the porous carbon is weakened, which is not preferable for application to the manufacturing process of the electrode.

The shape of the porous carbon material is in the form of sphere, rod, needle, plate, tube, or bulk, and can be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT), and multiwall carbon nanotubes (MWCNT); carbon fibers such as graphite nanofiber (GNF), carbon nanofiber (CNF), and activated carbon fiber (ACF); and activated carbon.

In the present invention, before step (a), the particle size (based on $D_{50}$) of the sulfur-carbon composite can be adjusted in the range of 30 to 70 μm by grinding or agglomerating the porous carbon material (1 step adjustment).

The grinding may use an attrition mill, a ball mill, a jet mill, a resonance acoustic mixer, or the like. The grinding may be performed while adjusting the conditions depending on the size or strength of the starting carbon.

In addition, the agglomeration may use polymer carbonization or spray drying. The agglomeration may be performed by adjusting the flow rate used in spray drying, the concentration of the input solution, the injection temperature, and the injection speed.

By the above method, the particle size (based on $D_{50}$) of the sulfur-carbon composite of the present invention can be adjusted in the range of 30 to 70 μm, preferably in the range of 40 to 60 μm.

In addition, by the above method, the particle size (based on $D_{10}$) of the sulfur-carbon composite of the present invention can be adjusted in the range of 5 to 20 μm, preferably in the range of 5 to 15 μm, more preferably in the range of 5 to 10 μm.

In addition, by the above method, the particle size (based on $D_{90}$) of the sulfur-carbon composite of the present invention can be adjusted in the range of 100 μm or less, preferably in the range of 80 to 100 μm.

The sulfur used in step (a) above may be at least one selected from the group consisting of an inorganic sulfur ($S_8$), $Li_2S_n$ (n≥1), an organic sulfur compound, and a carbon-sulfur polymer [$(C_2S_x)_n$, x=2.5 to 50, n≥2]. Preferably, the inorganic sulfur ($S_8$) can be used.

In addition, sulfur is located on the surface as well as inside the pores of the porous carbon material, and at this time, sulfur may be present in an area of less than 100%, preferably 1 to 95%, more preferably 60 to 90% of the entire outer surface of the porous carbon material. When sulfur is within the above range on the surface of the porous carbon material, it can exhibit the maximum effect in terms of the electron transfer area and the wettability of the electrolyte solution. Specifically, since sulfur is impregnated thinly and evenly on the surface of the porous carbon material in the above range, the electron transfer contact area can be increased during the charging/discharging process. If sulfur is located in the 100% area of the surface of the porous carbon material, the porous carbon material is completely covered with sulfur, so that the wettability of the electrolyte solution is deteriorated and the contact property with the conductive material contained in the electrode is decreased, and thus the electrons are not transmitted, it cannot participate in the reaction.

The sulfur-carbon composite can carry sulfur in a high content due to various sizes of pores in the structure and three-dimensionally interconnected and regularly arranged pores. Therefore, although a soluble polysulfide is produced by an electrochemical reaction, if it can be located inside a sulfur-carbon composite, the structure entangled in three dimensions can be maintained to suppress the collapse of the positive electrode structure even in the case of polysulfide leaching. As a result, the lithium-sulfur battery comprising the sulfur-carbon composite has an advantage that high capacity can be realized even under high loading. The sulfur loading amount of the sulfur-carbon composite according to the present invention may be 5 to 20 mg/cm².

In step (a), when sulfur and the porous carbon material are mixed, the weight ratio of sulfur and the porous carbon material may be 9:1 to 7:3, preferably 8:2 to 7.5:2.5. If the weight ratio is less than the above range, the content of the porous carbon material increases, and thus the amount of the binder required for preparing the positive electrode slurry is increased. Such an increase in the amount of binder will eventually increase the sheet resistance of the electrode and may serve as an insulator for blocking the electron pass, thereby degrading the cell performance. In addition, there is a problem that due to the low sulfur content, since it is not possible to produce a high sulfur content composite, the electrode becomes thicker in order to manufacture a high sulfur loading electrode using a sulfur-carbon composite having low sulfur content, and thus the energy density becomes high. On the contrary, if the content of sulfur exceeds the above-mentioned weight ratio range, since sulfur is agglomerated with each other and difficult to receive electron, sulfur may be difficult to participate directly in the reaction of the electrode.

In step (a), when sulfur and the porous carbon material are mixed, the mixed weight of sulfur and the porous carbon material may be 10 g or more. When mixing in a small amount of 10 g or less, sulfur and the porous carbon material can be easily mixed with mortar, but when mixing in a large amount of 10 g or more, they must be mixed through a ball grinding process because they are not easily mixed with mortar.

In step (a), when sulfur and the porous carbon material are mixed, the mixing may be performed to adjust the particle size (based on $D_{50}$) of the sulfur-carbon composite in the range of 30 μm to 70 μm.

In the present invention, the method for mixing, so that the particle size required in step (a) occurs, pulverizes the carbon material first to the desired particle size before mixing sulfur and carbon material and then mixes sulfur and carbon, or the method uses a high speed rotary mixer to cause the pulverization to occur during the mixing of sulfur and the carbon material, or the method can be adjusted to cause grinding with mixing by using a ball mill.

In the present invention, in order to control the particle size (based on $D_{50}$) of the sulfur-carbon composite in the range of 30 to 70 μm, the grinding and mixing may be carried out by putting zirconia balls, carbon and sulfur together in a container and performing a ball mill, for example, for 2-3 hours at 200 rpm, using the 2-roll mill equipment according to the ball mill method.

In addition, if the carbon obtained after grinding the carbon with zirconia ball at 500 rpm using an attrition mill meets the desired particle size, the carbon is taken out and then the mixing can be performed by mixing the carbon and sulfur, for example, at 1500 rpm for 30 minutes by a Henschel mixer.

By the above method, the particle size (based on $D_{50}$) of the sulfur-carbon composite of the present invention can be adjusted in the range of 30 to 70 μm, preferably in the range of 40 to 60 μm.

In addition, by the above method, the particle size (based on $D_{10}$) of the sulfur-carbon composite of the present invention can be adjusted in the range of 5 to 20 μm, preferably in the range of 5 to 15 μm, more preferably in the range of 5 to 10 μm.

In addition, by the above method, the particle size (based on $D_{90}$) of the sulfur-carbon composite of the present invention can be adjusted in the range of 100 μm or less, preferably in the range of 80 to 100 μm.

Thereafter, the method for preparing the sulfur-carbon composite according to the present invention comprises (b) heat-treating the mixed porous carbon material and sulfur.

The heat treatment may be carried out at a temperature of 130° C. to 170° C., and the heat treatment time is not particularly limited, but may be performed for 15 minutes to 2 hours. If the temperature range exceeds 170° C., there is a problem that sulfur is vaporized. If the temperature range is less than 130° C., there is a problem that sulfur does not melt and is not evenly distributed accordingly. In addition, if the heat treatment time is less than 15 minutes, there is a problem that sulfur is not sufficiently melted and thus is not sufficiently impregnated. If the heat treatment time exceeds 2 hours, there is a problem that some of the sulfur is vaporized or unevenly impregnated.

In the present invention, in order to adjust the particle size (based on $D_{50}$) of the sulfur-carbon composite in the range of 30 to 70 μm, the sulfur-carbon composite may be milled after step (b).

Specifically, the grinding method may be used without particular limitation as long as the grinding method does not dissolve sulfur, and may preferably use a ball mill, an attrition mill, or a jet mill.

The grinding may be performed by putting together the composite with the zirconia ball and grinding at 200 rpm for 2 hours, for example, using a roll-mill device by the ball mill method.

By the above method, the particle size (based on $D_{50}$) of the sulfur-carbon composite of the present invention can be adjusted in the range of 30 to 70 μm, preferably in the range of 40 to 60 μm.

In addition, by the above method, the particle size (based on $D_{10}$) of the sulfur-carbon composite of the present invention can be adjusted in the range of 5 to 20 μm, preferably in the range of 5 to 15 μm, more preferably in the range of 5 to 10 μm.

In addition, by the above method, the particle size (based on $D_{90}$) of the sulfur-carbon composite of the present invention can be adjusted in the range of 100 μm or less, preferably in the range of 80 to 100 μm.

In the present invention, in order to adjust the particle size (based on $D_{50}$) of the sulfur-carbon composite to the range of 30 to 70 μm, step (c) of preparing a slurry by mixing a binder, a dispersant, and an electrically conductive material in the sulfur-carbon composite may be further performed after step (b).

Step (c) may be performed in a batch container. The batch container may be equipped with all the equipment for mixing using the ball. For example, an impeller may be provided therein.

In addition, if a large container of 200 ml or more is used in the preparation of a conventional slurry, since the physical properties of the slurry are lowered, the conventional slurry was prepared using a small container of 200 ml or less. However, the method of preparing the slurry of the present invention allows the use of large containers of 200 ml or more and makes it possible to mix 100 g or more slurry by optimizing the conditions of slurry preparation (amount of milling ball, mixing rpm).

Thus, the batch container may be a large container of 200 ml or more, and the upper limit of the capacity is not particularly limited, but may preferably be 1000 ml or less. There is no particular limitation on the amount of slurry that can be prepared, however, the slurry can be prepared in an amount of preferably 1000 g or less.

In the mixing, milling balls may be used for dispersing, or the grinding may be performed using a blade.

In the method of preparing the sulfur-carbon composite according to the present invention, it is preferable to mix by a rotary stirring method and perform the stirring by setting a higher rpm. The specific rpm value may vary depending on the mixing scale. Preferably, when mixing the slurry, the mixing may be performed in three steps.

In the mixing step consisting of the three steps, step is to mix the binder and the dispersant, and then to prepare a uniform solution, step 2 is to disperse the conductive material in the mixed solution prepared in step 1, and step 3 is to disperse the complex in the mixed solution prepared in step 2. In each mixing step, the mixing may be performed at 500 to 1000 rpm in step 1, at 2000 to 5000 rpm in step 2, and at 2000 to 5500 rpm in step 3.

The milling ball used in the method for preparing the sulfur-carbon composite according to the present invention may be a zirconia ($ZrO_2$) ball or an alumina ($Al_2O_3$) ball.

By the above method, the particle size (based on $D_{50}$) of the sulfur-carbon composite of the present invention can be adjusted in the range of 30 to 70 μm, preferably in the range of 40 to 60 μm.

In addition, by the above method, the particle size (based on $D_{10}$) of the sulfur-carbon composite of the present invention can be adjusted in the range of 5 to 20 μm, preferably in the range of 10 to 20 μm, more preferably in the range of 15 to 20 μm.

In addition, by the above method, the particle size (based on $D_{90}$) of the sulfur-carbon composite of the present invention can be adjusted in the range of 80 to 120 μm, preferably in the range of 90 to 120 μm, more preferably in the range of 100 to 120 μm.

Sulfur-Carbon Composite

In the sulfur-carbon composite of the present invention, by controlling the particle size of sulfur-carbon under various conditions at various stages during manufacture, the particle size (based on $D_{50}$) of the sulfur-carbon composite is controlled in the range of 30 to 70 μm.

The sulfur-carbon composite comprises porous carbon material; and sulfur on at least part of the inside and the surface of the porous carbon material.

The porous carbon material provides a framework capable of uniformly and stably immobilizing sulfur, which is a positive electrode active material, and supplements the electrical conductivity of sulfur to enable the electrochemical reaction to proceed smoothly.

The porous carbon material can be generally produced by carbonizing precursors of various carbon materials. The porous carbon material may comprise uneven pores therein, the average diameter of the pores is in the range of 1 to 200 nm, and the porosity may be in the range of 10 to 90% of the total volume of the porosity. If the average diameter of the pores is less than the above range, the pore size is only at the molecular level and impregnation with sulfur is impossible. On the contrary, if the average diameter of the pores exceeds the above range, the mechanical strength of the porous carbon is weakened, which is not preferable for application to the manufacturing process of the electrode.

The shape of the porous carbon material is in the form of sphere, rod, needle, plate, tube, and bulk, and can be used without limitation as long as it is commonly used in a lithium secondary battery or lithium-sulfur battery, etc.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT), and multiwall carbon nanotubes (MWCNT); carbon fibers such as graphite nanofiber (GNF), carbon nanofiber (CNF), and activated carbon fiber (ACF); and activated carbon. The sulfur may be at least one selected from the group consisting of inorganic sulfur ($S_8$), $Li_2S_n$ (n≥1), an organic sulfur compound, and a carbon-sulfur polymer [$(C_2S_x)_n$, x=2.5 to 50, n≥2]. Preferably, inorganic sulfur ($S_8$) can be used.

In the sulfur-carbon composite according to the present invention, the weight ratio of sulfur and the porous carbon material may be 9:1 to 7:3, preferably 8:2 to 7.5:2.5. If the weight ratio is less than the above range, the content of the porous carbon material increases, and thus the amount of the binder required for preparing the positive electrode slurry is increased. Such an increase in the amount of binder will eventually increase the sheet resistance of the electrode and may serve as an insulator for blocking the electron pass, thereby degrading the cell performance. On the contrary, if the content of sulfur exceeds the above-mentioned weight ratio range, since sulfur is agglomerated with each other and difficult to receive electron, sulfur may be difficult to participate directly in the reaction of the electrode.

In addition, sulfur is located on the surface as well as inside the pores of the porous carbon material, and at this time, sulfur may be present in an area of less than 100%, preferably 1 to 95%, more preferably 60 to 90% of the entire outer surface of the porous carbon material. When sulfur is within the above range on the surface of the porous carbon material, it can exhibit the maximum effect in terms of the electron transfer area and the wettability of the electrolyte solution. Specifically, since sulfur is impregnated thinly and evenly on the surface of the porous carbon material in the above range, the electron transfer contact area can be increased during the charging/discharging process. If sulfur is located in the 100% area of the surface of the porous carbon material, since the porous carbon material is completely covered with sulfur, so that the wettability of the electrolyte solution is deteriorated and the contact property with the conductive material contained in the electrode is decreased, and thus the electrons are not transmitted, it cannot participate in the reaction.

As stated above, in the sulfur-carbon composite of the present invention, by controlling the particle size of sulfur-carbon under various conditions at various stages during manufacture, the particle size (based on $D_{50}$) of the sulfur-carbon composite may be adjusted in the range of 30 to 70 µm. More specifically, the particle size (based on D50) of the sulfur-carbon composite may have a range of 40 to 60 µm, a range of 45 to 60 µm, or a range of 50 to 60 µm. In the case of the composite particle size of the range region, the pores having a larger size than the pores formed by the composite having a smaller particle size may be formed in the electrode structure, thereby making the electrolyte solution easier to enter and exit.

In addition, in the sulfur-carbon composite of the present invention, the particle size (based on $D_{10}$) of the sulfur-carbon composite may be in a range of 20 µm or less, specifically, in a range of 5 to 20 µm, preferably in the range of 5 to 15 µm, more preferably in the range of 5 to 10 µm. If the amount of the fine powder is increased, the amount of the binder for forming the electrode may be increased, and resistance may be generated. If the amount of the fine powder is too small, the structure of the electrode may not be compact, which may adversely affect the conductivity of the electrode.

In addition, in the sulfur-carbon composite of the present invention, the particle size (based on $D_{90}$) of the sulfur-carbon composite may be in a range of 100 µm or less. More specifically, the particle size (based on $D_{90}$) of the sulfur-carbon composite may have a range of 80 to 100 µm. If the particle size is larger than the above range region, there is a problem that when the electrode is subsequently rolled to reduce the thickness, the composite breaks inside the electrode. In addition, even without rolling, the presence of a composite having a large particle size may reduce electrode nonuniformity and affect electrode performance.

The sulfur-carbon composite may support sulfur in a high content, due to the pores of various sizes in the structure and the three-dimensionally interconnected and regularly aligned pores. As a result, although the soluble polysulfide is produced by electrochemical reaction, if the polysulfide is located inside the sulfur-carbon composite, the structure of the three-dimensional entanglement is maintained even during the dissolution of the polysulfide, thereby suppressing the collapse of the positive electrode structure. As a result, the lithium secondary battery comprising the sulfur-carbon composite has an advantage that high capacity can be realized even at high loading. Therefore, sulfur loading of the sulfur-carbon composite according to the present invention may be 5 to 20 mg/cm$^2$.

Positive Electrode for Lithium Secondary Battery

The sulfur-carbon composite proposed in the present invention may be preferably used as a positive electrode active material for a lithium secondary battery.

The positive electrode is manufactured by applying and drying a composition for forming a positive electrode active material layer on a positive electrode current collector. The composition for forming the positive electrode active material layer is prepared by mixing the sulfur-carbon composite described above with a conductive material and a binder, and then applying it to a current collector and drying at 40 to 70 for 4 to 12 hours.

Specifically, in order to imparts additional conductivity to the prepared sulfur-carbon composite, an electrically conductive material may be added to the positive electrode composition. The electrically conductive material serves to cause electrons to move smoothly in the positive electrode, and is not particularly limited as long as it can provide an excellent electrical conductivity and a large surface area without causing chemical changes in the battery, but preferably a carbon-based material is used.

The carbon-based material may be any one selected from the group consisting of graphite-based materials such as natural graphite, artificial graphite, expanded graphite, and graphene; active carbon-based material; carbon black-based materials such as channel black, furnace black, thermal black, contact black, lamp black, and acetylene black; carbon fiber-based material; carbon nano structures such as carbon nanotube (CNT) and fullerene; and a combination thereof.

In addition to the carbon-based materials, metallic fiber such as metal mesh; metallic powder such as copper (Cu), silver (Ag), nickel (Ni), and aluminum (Al); or organic electrically conductive materials such as polyphenylene derivatives may also be used according to purpose. The electrically conductive materials may be used alone or in a combination thereof.

In addition, in order to provide the positive electrode active material with the adhesion to the current collector, a binder may be additionally comprised in the positive electrode composition. The binder should be well dissolved in a solvent, and the binder not only has to constitute an electrically conductive network between the positive electrode active material and the conductive material well, but also should have a moderate impregnation property for an electrolyte solution.

The binder applicable to the present invention may be any binder known in the art, and specifically may be at least one selected from the group consisting of fluororesin-based binders comprising polyvinylidene fluoride (PVdF) or polytetrafluoroethylene (PTFE); rubber-based binders comprising styrene-butadiene rubber, acrylonitrile-butadiene rubber, and styrene-isoprene rubber; cellulosic binders comprising carboxy methyl cellulose (CMC), starch, hydroxypropyl cellulose, and regenerated cellulose; polyalcohol-based binder; polyolefin-based binders comprising polyethylene and polypropylene; polyimide-based binders, polyester-based binders, and silane-based binders, or a mixture or copolymer of two or more of these, but is not limited thereto.

The content of the binder resin may be, but is not limited to, 0.5 to 30 wt. % based on the total weight of the electrode. If the content of the binder resin is less than 0.5 wt. %, the physical properties of the positive electrode may be degraded and thus the positive electrode active material and the electrically conductive material may be eliminated. If the content exceeds 30 wt. %, the ratio of the active material and the electrically conductive material in the positive electrode is relatively reduced and thus the capacity of the battery can be reduced.

The solvent for making the positive electrode composition in slurry state should be easy to dry, and should dissolve the binder well, but a solvent capable of keeping the positive electrode active material and the electrically conductive material in a dispersed state without dissolving them is most preferable. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems with the electrically conductive network, thereby causing problems with regard to the operation of the battery.

The solvent according to the present invention may be water or an organic solvent. The organic solvent may be an organic solvent comprising at least one selected from the group consisting of dimethylformamide, isopropyl alcohol, acetonitrile, methanol, ethanol, and tetrahydrofuran.

The mixing of the positive electrode composition can be carried out by a conventional method using a conventional mixer such as a paste mixer, a high-speed shear mixer, or a homo-mixer.

The positive electrode composition may be applied to a current collector, and vacuum dried to form a positive electrode. The slurry can be coated on the current collector in an appropriate thickness depending on the viscosity of the slurry and the thickness of the positive electrode to be formed, and can be suitably selected within the range of 10 to 300 μm.

In that case, there is no limitation on the method of coating the slurry, and examples thereof may comprise doctor blade coating, dip coating, gravure coating, slit die coating, spin coating, comma coating, bar coating, reverse roll coating, screen coating, and cap coating methods.

The positive electrode current collector generally can be made in a thickness of 3 to 500 μm and is not particularly limited as long as it has high conductivity without causing chemical changes in the battery. For example, a conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam, or nonwoven fabric.

Lithium Secondary Battery

In one embodiment of the present invention, the lithium secondary battery comprises the positive electrode as mentioned above; a negative electrode comprising lithium metal or lithium alloy as negative electrode active material; a separator interposed between the positive electrode and the negative electrode; and an electrolyte impregnated in the negative electrode, positive electrode, and separator and containing a lithium salt and an organic solvent.

In particular, the lithium secondary battery of the present invention may be a lithium-sulfur battery containing sulfur in the positive electrode.

The negative electrode may comprise a material capable of reversibly intercalating or deintercalating lithium ion ($Li^+$), a material capable of reacting with lithium ion to reversibly form a lithium-containing compound, lithium metal, or a lithium alloy as a negative electrode active material. The material capable of reversibly intercalating or deintercalating lithium ion ($Li^+$) may be, for example, crystalline carbon, amorphous carbon, or mixtures thereof. The material capable of reacting with lithium ion ($Li^+$) to reversibly form the lithium-containing compound may be, for example, tin oxide, titanium nitrate, or silicon. The lithium alloy may be, for example, an alloy of lithium and the metal selected from the group consisting of Na, K, Rb, Cs, Fr, Be, Mg, Ca, Sr, Ba, Ra, Al, and Sn.

Also, in the process of charging/discharging the lithium-sulfur battery, sulfur used as a positive electrode active material can be changed to an inactive material and then attached to the surface of the lithium negative electrode. As mentioned above, the inactive sulfur means sulfur which is no longer able to participate in the electrochemical reaction of the positive electrode through various electrochemical or chemical reaction. The inactive sulfur formed on the surface of the lithium negative electrode also has the advantage of acting as a protective layer of the lithium negative electrode. Therefore, the lithium metal and the inactive sulfur formed on the lithium metal, such as lithium sulfide, may be used as a negative electrode.

The negative electrode of the present invention may further comprise a pretreatment layer made of a lithium ion conductive material, and a lithium metal protective layer formed on the pretreatment layer, in addition to the negative electrode active material.

The separator interposed between the positive electrode and the negative electrode separates or isolates the positive and negative electrodes from each other, allows the transport of lithium ions between the positive and negative electrodes, and can be made of porous nonconductive or insulating materials. The separator may be an independent member such as a film or a thin film as an insulator having high ion permeability and mechanical strength, or may be a coating layer added to the positive electrode and/or the negative electrode. Also, when a solid electrolyte such as a polymer is used as an electrolyte, the solid electrolyte may also serve as a separator.

The separator preferably has a pore diameter of 0.01 to 10 μm and a thickness of 5 to 300 μm. Glass electrolyte, polymer electrolyte or ceramic electrolyte, etc., can be used as the separator. For example, olefin-based polymers such as polypropylene having chemical resistance and hydrophobicity, a sheet or nonwoven fabric made of glass fiber or polyethylene, Kraft paper and the like are used. Representative examples currently available on the market comprise Celgard series (Celgard$^R$ 2400, 2300 product from Hoechest Celanese Corp.), polypropylene separator (product from Ube Industries Ltd. or product from Pall RAI), polyethylene series (Tonen or Entek), and the like.

The electrolyte separator in the state of solid may comprise less than about 20 wt. % of non-aqueous organic solvent. In this case, an appropriate gelling agent may be further comprised to reduce the fluidity of the organic solvent. Representative examples of such gelling agent may comprise polyethylene oxide, polyvinylidene fluoride, and polyacrylonitrile, etc.

The electrolyte impregnated in the negative electrode, the positive electrode, and the separator is composed of a lithium salt and an electrolyte solution as a non-aqueous electrolyte containing a lithium salt. Non-aqueous organic solvent, organic solid electrolyte, and inorganic solid electrolyte, etc., are used as the electrolyte solution.

The lithium salt of the present invention is a substance which can be easily dissolved in a non-aqueous organic solvent, and for example, may comprise at least one selected from the group consisting of LiSCN, LiCl, LiBr, LiI, LiPF$_6$, LiBF$_4$, LiSbF$_6$, LiAsF$_6$, LiB$_{10}$Cl$_{10}$, LiCH$_3$SO$_3$, LiCF$_3$SO$_3$, LiCF$_3$CO$_2$, LiClO$_4$, LiAlCl$_4$, Li(Ph)$_4$, LiC(CF$_3$SO$_2$)$_3$, LiN(FSO$_2$)$_2$, LiN(CF$_3$SO$_2$)$_2$, LiN(C$_2$F$_5$SO$_2$)$_2$, LiN(SFO$_2$)$_2$, LiN(CF$_3$CF$_2$SO$_2$)$_2$, lithium chloroborane, lithium lower aliphatic carboxylate, lithium tetraphenyl borate, lithium imide, and combinations thereof.

The concentration of the lithium salt may be 0.2 to 2 M, specifically 0.6 to 2 M, more specifically, 0.7 to 1.7 M, depending on various factors such as the exact composition of the electrolyte mixture, the solubility of the salt, the conductivity of the dissolved salt, the charging and discharging conditions of the battery, the operating temperature and other factors known in the lithium battery field. If the concentration of the lithium salt is less than 0.2 M, the conductivity of the electrolyte may be lowered, and thus the performance of the electrolyte may be deteriorated. If the concentration of the lithium salt exceeds 2 M, the viscosity of the electrolyte may increase, and thus the mobility of the lithium ion (Li$^+$) may be reduced.

The non-aqueous organic solvent should dissolve the lithium salt well, and the non-aqueous organic solvent of the present invention may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixture of two or more organic solvents thereof.

As the organic solid electrolyte, for example, polyethylene derivatives, polyethylene oxide derivatives, polypropylene oxide derivatives, phosphate ester polymers, poly polyalginate lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, —Li$_3$PO$_4$—Li$_2$S—SiS$_2$ may be used.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ may be used.

To the electrolyte of the present invention, for example, pyridine, triethylphosphite, triethanolamine, cyclic ether, ethylene diamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging/discharging characteristics, flame retardancy, and the like. In some cases, a halogen-containing solvent such as carbon tetrachloride, ethylene trifluoride or the like can be also added for the purpose of imparting nonflammability, and carbon dioxide gas can be further comprised for the purpose of improving storage characteristics at a high temperature, and fluoroethylene carbonate (FEC), propene sultone (PRS), fluoropropylene carbonate (FPC) and the like can be further comprised.

The electrolyte may be used as a liquid electrolyte or also as an electrolyte separator form in a solid state. When used as a liquid electrolyte, a separator made of porous glass, plastic, ceramic, or polymer is further comprised as a physical separator having a function of physically separating the electrode.

Hereinafter, preferred examples are provided to aid the understanding of the present invention, but the following examples are merely to illustrate the present invention, and it is apparent to those skilled in the art that various variations and modifications can be made within the scope and spirit of the present invention, and that such variations and modifications fall within the scope of the appended claims.

EXAMPLE

Preparation of Sulfur-Carbon Composite

Example 1 (First Adjustment of Particle Size of Carbon)

200 g of carbon nanotubes (product of LG Chemical) having a specific surface area of 200 cm$^2$ were ground at 500 rpm for 5 minutes using 5 mm zirconia balls by an attrition mill (M tech, attrition mill 5 L).

50 g of the ground carbon nanotubes were mixed with 150 g of sulfur (α-Sulfur from Aldrich company) at 150 rpm for 30 minutes by a process of blade mixing (using a Henschel mixer). In the mixing process, there was little carbon grinding effect. Thereafter, heat treatment was performed for 30 minutes in an oven at 155° C. to prepare a sulfur-carbon composite.

Example 2 (Adjustment of Particle Size During the Mixing of Sulfur and Carbon)

50 g of the same carbon nanotubes as in Example 1 were mixed with 150 g of sulfur (α-Sulfur from Aldrich company) by a ball milling process. The ball milling process was performed for 2 hours at a milling condition of 200 RPM using 5 mm zirconia balls.

Thereafter, heat treatment was performed for 30 minutes in an oven at 155 to prepare a sulfur-carbon composite.

Example 3 (Adjustment of Particle Size after Preparation of Composite)

50 g of the same carbon nanotubes as in Example 1 were mixed with 150 g of sulfur (α-Sulfur from Aldrich company) by a blade mixing process (using a Henschel mixer). In the mixing process, there was little carbon grinding effect. Thereafter, heat treatment was performed for 30 minutes in an oven at 155 to prepare a sulfur-carbon composite. Thereafter, the prepared sulfur-carbon composite was subjected to a ball milling process again for 2 hours at a milling condition of 200 RPM using 5 mm zirconia balls.

Example 4-1 (Adjustment of Particle Size in Preparation Step of Slurry)

50 g of the same carbon nanotubes as in Example 1 were mixed with 150 g of sulfur (α-Sulfur from Aldrich company) by a blade mixing process (using a Henschel mixer). In the mixing process, there was little carbon grinding effect. Thereafter, heat treatment was performed for 30 minutes in an oven at 155 to prepare a sulfur-carbon composite.

The sulfur-carbon composite, the binder, the dispersant, and the electrically conductive material were mixed in a stainless slurry container having a volume of 500 ml at a weight ratio of 87:7:1:5 of sulfur-carbon composite:binder:dispersant:conductive material to prepare 240 g of a slurry (25% solids). A polyacrylic-based binder was used as the binder, a polyvinyl-based dispersant was used as the dispersant, and vapor grown carbon fibers (VGCF) were used as an electrically conductive material.

$ZrO_2$ balls were added to the slurry so that the weight ratio of slurry:$ZrO_2$ balls was 2:1 in the vessel, followed by stirring for 30 minutes using an impeller having a diameter of 5 cm. At the time of stirring, the mixing rpm was stirred at each step for the same time at 800 rpm in step 1, 4000 rpm in step 2, and 5000 rpm in step 3, to prepare a slurry for manufacturing a positive electrode.

Example 4-2

A slurry (25% solids) was prepared in the same manner as in Example 4-1 except that the stirring time was increased from 30 minutes to 60 minutes.

Comparative Example 1

A sulfur-carbon composite was prepared in the same manner as in Example 3, except that the composite is further ground in the same manner as in Example 3, so that the $D_{50}$ is 10 μm.

Comparative Example 2

A sulfur-carbon composite was prepared in the same manner as in Example 1, except that after grinding the carbonaceous material in the same manner as in Example 1, large particles were removed through classification, and thus the $D_{50}$ was 25 μm.

Comparative Example 3

A sulfur-carbon composite was prepared in the same manner as in Example 2, except that after grinding the carbonaceous material in the same manner as in Example 1, large particles were removed through classification, and thus the $D_{50}$ was 73 μm.

Comparative Example 4-1

A slurry (25% solids) was prepared in the same manner as in Example 4-1, except that while checking the particle size of the slurry, the stirring was performed until the particle size was reduced to 31 μm by increasing the stirring time.

Comparative Example 4-2

A slurry (25% solids) was prepared in the same manner as in Example 4-1, except that while checking the particle size of the slurry, the stirring was performed until the particle size was reduced to 22 μm by increasing the stirring time.

Comparative Example 4-3

A slurry (25% solids) was prepared in the same manner as in Example 4-1, except that while checking the particle size of the slurry, the stirring was performed until the particle size ($D_{50}$) reaches 65 μm by increasing the stirring time.

Experimental Example 1: Evaluation of Physical Properties of Slurry (Measurement of Particle Size Distribution)

The sulfur-carbon composites prepared in Examples 1 to 3 and Comparative Examples 1 to 3 were measured for particle size distribution using a bluewave product from a microtrac company, and the results are shown in Table 1 below.

TABLE 1

| | Example 1 | Example 2 | Example 3 | Comparative Example 1 | Comparative Example 2 | Comparative Example 3 |
|---|---|---|---|---|---|---|
| $D_{10}$ (μm) | 12.0 | 17.2 | 18.0 | 4.55 | 8.91 | 48.22 |
| $D_{50}$ (μm) | 37.25 | 56.4 | 51.0 | 10.05 | 25.52 | 72.78 |
| $D_{90}$ (μm) | 81.22 | 103.0 | 92.0 | 16.94 | 65.52 | 112.7 |

Through the results in Table 1, it can be seen that the difference in particle size distribution of the sulfur-carbon composite appears depending on the particle size control conditions when the sulfur-carbon composite is manufactured.

In addition, the slurry prepared in Examples 4-1 to 4-2 and Comparative Examples 4-1 to 4-3 was measured for particle size distribution using a bluewave product from a microtrac company, and the results are shown in Table 2 below and FIG. 1.

TABLE 2

|  | Example 4-1 | Example 4-2 | Comparative Example 4-1 | Comparative Example 4-2 | Comparative Example 4-3 |
|---|---|---|---|---|---|
| $D_{50}$ (μm) | 49.42 | 40.63 | 31.08 | 21.76 | 65.27 |

In addition, through the results in Table 2, it can be seen that there is a difference in particle size distribution of sulfur-carbon composites depending on grinding time in the preparation step of the slurry containing sulfur-carbon composites.

Experimental Example 2: Evaluation of Battery Performance

While using the sulfur-carbon composite prepared in Examples 1 to 3 and Comparative Examples 1 to 4, the sulfur-carbon composite, the electrically conductive material, and the binder were mixed at a weight ratio of 90:5:5 of sulfur-carbon composite:electrically conductive material: binder to prepare a slurry, and then coated it on a current collector of 20 μm thick aluminum foil to prepare an electrode. In this case, carbon black was used as the conductive material and styrene butadiene rubber and carboxymethyl cellulose were used as the binder. Then, the electrode was prepared by drying overnight in an oven at 50° C.

In addition, the slurries prepared in Examples 4-1 to 4-2 and Comparative Examples 4-1 to 4-3 were coated on current collectors in the same manner to prepare electrodes.

A coin cell was prepared using the prepared positive electrode as a positive electrode, using polyethylene as a separator, and using a 45 μm thick lithium foil as a negative electrode. At this time, the coin cell used electrolyte prepared by dissolving 1 M LiTFSI, 3% by weight $LiNO_3$ in an organic solvent consisting of DOL/DME solvent (1:1 volume ratio).

(Evaluation of Charging and Discharging Characteristics)

For the coin cell prepared above, a charging/discharging characteristic change was tested using a charging/discharging measurement device. Using the obtained cell, initial charging/discharging was performed at 0.1 C/0.1 C during the initial 2.5 cycles, and then at 0.2 C/0.2 C during 3 cycles, and then the cycles were performed at 0.5 C/0.3 C.

The results were measured and shown in Table 3 and FIG. 2. In Table 3 and FIG. 2, the porosity was calculated by measuring the thickness of the electrode and using true density and weight, and the loading amount was calculated using the weight and area of the electrode.

TABLE 3

|  | Specific capacity (mAh/g) | Porosity (%) | Loading (mAh/cm²) |
|---|---|---|---|
| Example 1 | 976 | 68 | 5.1 |
| Example 2 | 1044 | 68 | 5.9 |
| Example 3 | 1016 | 68 | 5.8 |
| Comparative Example 1 | 300 | 60 | 5.3 |
| Comparative Example 2 | 962 | 68 | 5.4 |
| Comparative Example 3 | 957 | 67 | 5.0 |

Through Table 3, it can be seen that the particle size of the composite affects the performance of the cell. In addition, FIG. 2 shows a graph showing initial charging/discharging characteristics of the batteries prepared in Examples 4-1 to 4-2 and Comparative Examples 4-1 to 4-3. Through FIG. 2, it was found that the performance of the cell is improved according to the limitation of the particle size of the slurry according to the present invention.

The invention claimed is:

1. A method for preparing a sulfur-carbon composite comprising:
   (a) mixing sulfur with a porous carbon material; and
   (b) heat-treating the mixed porous carbon material and sulfur to prepare the sulfur-carbon composite,
   wherein a particle size (based on $D_{50}$) of the sulfur-carbon composite is adjusted in the range of 37.25 μm to 70 μm.

2. The method for preparing the sulfur-carbon composite according to claim 1, further comprising before step (a), grinding or agglomerating the porous carbon material to adjust the particle size (based on $D_{50}$) of the sulfur-carbon composite in the range of 37.25 μm to 70 μm.

3. The method for preparing the sulfur-carbon composite according to claim 2, wherein the agglomeration is carried out using polymer carbonization or spray drying.

4. The method for preparing the sulfur-carbon composite according to claim 1, wherein in step (a), when mixing sulfur with the porous carbon material, the mixing is performed to adjust the particle size (based on $D_{50}$) of the sulfur-carbon composite in the range of 37.25 μm to 70 μm.

5. The method for preparing the sulfur-carbon composite according to claim 4, wherein the porous carbon material is adjusted in size by ball milling, which is performed by (a) first grinding the porous carbon material to a desired particle size before the process of mixing sulfur and the carbon material, and then mixing sulfur and carbon, or (b) by mixing so that the grinding occurs together in the process of mixing sulfur and the porous carbon material.

6. The method for preparing the sulfur-carbon composite according to claim 1, further comprising after step (b), grinding the sulfur-carbon composite to adjust the particle size (based on $D_{50}$) of the sulfur-carbon composite in the range of 37.25 μm to 70 μm.

7. The method for preparing the sulfur-carbon composite according to claim 1, further comprising after step (b), step (c) of preparing a slurry by mixing a binder, a dispersant, and a conductive material with the sulfur-carbon composite to adjust the particle size (based on $D_{50}$) of the sulfur-carbon composite in the range of 37.25 μm to 70 μm.

8. The method for preparing the sulfur-carbon composite according to claim 7, wherein step (c) is carried out in a batch container equipped with an impeller therein.

9. The method for preparing the sulfur-carbon composite according to claim 7, wherein when mixing the slurry, the mixing is performed through step 1 of mixing the binder and the dispersant, step 2 of dispersing the conductive material into the mixed solution prepared in step 1, and step 3 of dispersing the sulfur-carbon composite into the mixed solution prepared in step 2.

10. The method for preparing the sulfur-carbon composite according to claim 9, wherein when mixing the slurry, the mixing is performed by performing step 1 at 500 rpm to 1000 rpm, step 2 at 2000 rpm to 5000 rpm, and step 3 at 2000 rpm to 5500 rpm.

11. The method for preparing the sulfur-carbon composite according to claim 1, wherein the sulfur and the porous carbon material are mixed in a weight ratio of 9:1 to 7:3.

12. The method for preparing the sulfur-carbon composite according to claim 2, wherein the particle size (based on $D_{50}$) of the sulfur-carbon composite is adjusted in the range of 40 μm to 60 μm.

13. A sulfur-carbon composite comprising:
a porous carbon material; and
sulfur on at least part of an inside and a surface of the porous carbon material, wherein a particle size (based on $D_{50}$) of the sulfur-carbon composite is in the range of 37.25 μm to 70 μm.

14. The sulfur-carbon composite according to claim 13, wherein the particle size (based on $D_{50}$) of the sulfur-carbon composite is adjusted in the range of 40 μm to 60 μm.

15. The sulfur-carbon composite according to claim 13, wherein the particle size (based on $D_{10}$) of the sulfur-carbon composite is in the range of 5 μm to 20 μm.

16. The sulfur-carbon composite according to claim 13, wherein the particle size (based on $D_{90}$) of the sulfur-carbon composite is in the range of 80 μm to 100 μm.

17. The sulfur-carbon composite according to claim 13, wherein the sulfur-carbon composite is suitable as a positive electrode material for a lithium secondary battery.

18. A positive electrode comprising the sulfur-carbon composite of claim 13.

19. A lithium secondary battery comprising the positive electrode of claim 18;
a negative electrode; and an electrolyte.

20. The lithium secondary battery according to claim 19, wherein the lithium secondary battery comprises sulfur in the positive electrode.

* * * * *